United States Patent [19]

Seibert et al.

[11] Patent Number: 4,754,605

[45] Date of Patent: Jul. 5, 1988

[54] HYDRAULIC BRAKE SYSTEM

[75] Inventors: Wolfram Seibert, Pfungstadt; Norbert Ocvirk, Offenbach am Main; Juergen Schonlau, Niedernhausen; Guenter Trach, Offenbach am Main, all of Fed. Rep. of Germany

[73] Assignee: Alfred Teves GmbH, Frankfurt Am Main, Fed. Rep. of Germany

[21] Appl. No.: 838,687

[22] Filed: Mar. 12, 1986

[30] Foreign Application Priority Data

Mar. 12, 1985 [DE] Fed. Rep. of Germany ....... 3508709

[51] Int. Cl.⁴ .............................................. B60T 11/08

[52] U.S. Cl. ........................................ 60/578; 60/579; 60/582; 60/591; 60/593

[58] Field of Search ................. 60/567, 574, 576, 578, 60/579, 591, 593, 502; 303/114, 119

[56] References Cited

U.S. PATENT DOCUMENTS

| | | | |
|---|---|---|---|
| 4,225,022 | 9/1980 | Belart | 60/549 |
| 4,415,210 | 11/1983 | Belart | 303/116 |
| 4,453,782 | 6/1984 | Arikawa | 303/116 |
| 4,483,144 | 11/1984 | Steffes | 60/548 |
| 4,555,144 | 11/1985 | Belart | 303/119 |
| 4,582,365 | 4/1986 | Belart | 60/575 |
| 4,586,591 | 5/1986 | Belart | 303/119 |
| 4,598,955 | 9/1986 | Belart | 60/591 |
| 4,600,243 | 7/1986 | Belart | 303/114 |
| 4,611,858 | 9/1986 | Belart | 303/111 |

FOREIGN PATENT DOCUMENTS

| | | |
|---|---|---|
| 2452952 | 8/1976 | Fed. Rep. of Germany . |
| 2744408 | 4/1979 | Fed. Rep. of Germany . |
| 3108908 | 9/1982 | Fed. Rep. of Germany . |
| 2083581 | 3/1982 | United Kingdom . |

*Primary Examiner*—Abraham Hershkovitz

*Attorney, Agent, or Firm*—James B. Raden; Robert P. Seitter

[57] ABSTRACT

A hydraulic brake system comprising a pedal-operated brake booster (5), which is connected with the master cylinder (3) and includes an auxiliary pressure supply system (13), a booster piston (4), and a booster chamber (7) wherein an auxiliary pressure is established which is proportional to the foot pressure·(F). The hydraulic brake system is provided with wheel brakes (14,15,16,17) connected to the master cylinder (3), a filling stage cylinder (18) is provided which displaceably houses a two-stage piston (20). A pressure chamber (21) is arranged in front of the large stage (83) of the two-stage piston (20) and a filling chamber (22) is arranged in front of the small stage (84) of the two-stage piston (20). In this arrangement, the filling chamber (22) communicates with one of the working chambers (26) of the master cylinder (3) and/or a brake line (28) by way of a pressure line (25). The booster piston (4) plunges into an annular chamber (65) arranged between the master cylinder (3) and the brake booster (5). The annular chamber (65) communicates with the pressure chamber( 21) of the filling stage cylinder (18), on the one hand, and with the supply reservoir (55), on the other hand. Connected into the pressure medium path (24,80) from the annular chamber (65) to the supply reservoir (55), to this end, is a valve (79) operable by the pressure in the booster chamber (7). In one of its positions, the valve (79) blocks the pressure medium passage towards the supply reservoir (55). Thus, upon the braking operation, the valve (79) permits the pressure medium to flow from the annular chamber (65) into the pressure chamber (21) of the filling stage cylinder (18) and in its other position the valve (79) connecting the annular chamber (65) with the supply reservoir (55).

5 Claims, 1 Drawing Sheet

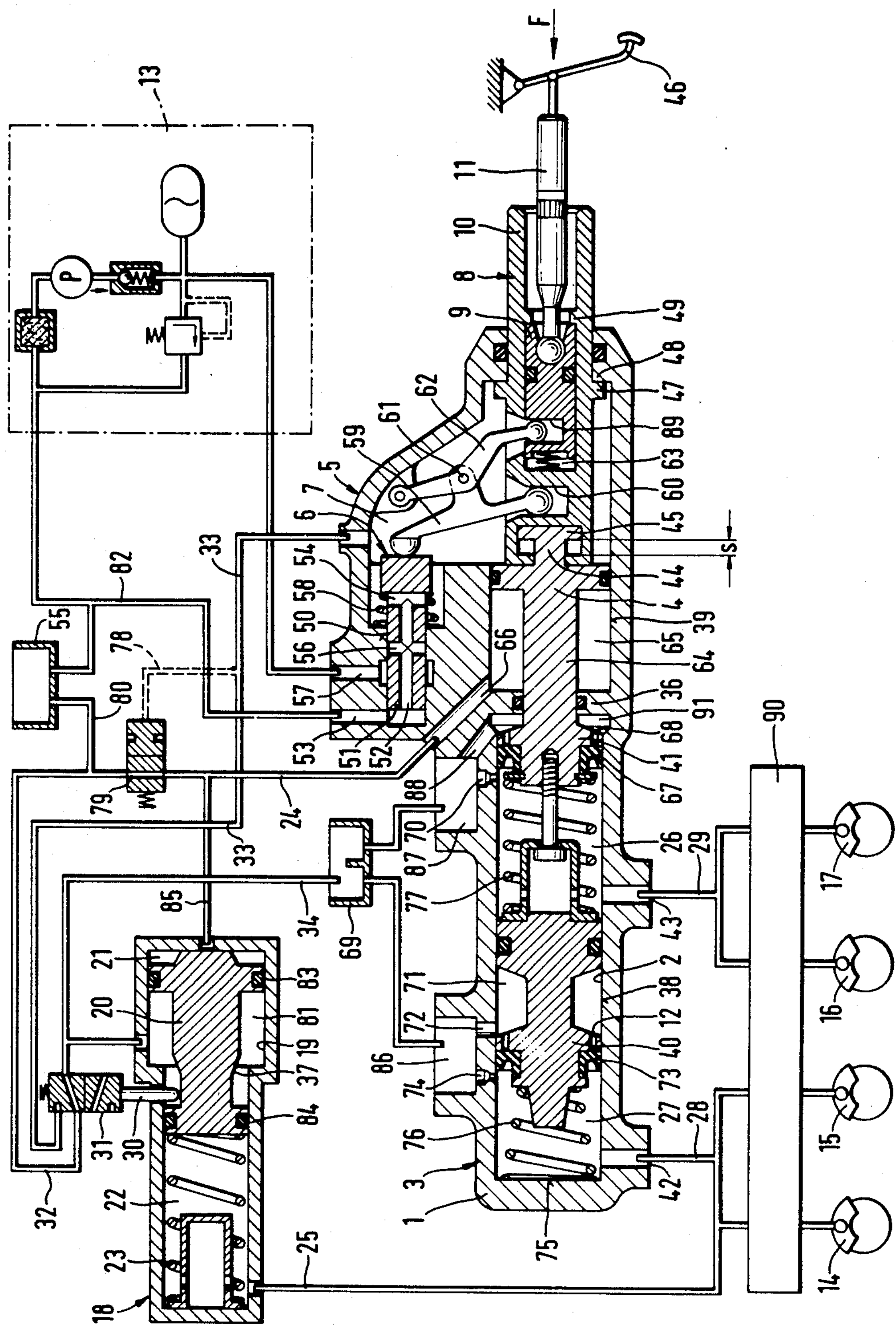

HYDRAULIC BRAKE SYSTEM

BACKGROUND OF THE INVENTION

The present invention relates to a hydraulic brake system comprising a pedal-operated brake booster, which is connected with the master cylinder and which has an auxiliary pressure supply system, a booster piston, and a booster chamber wherein an auxiliary pressure is established which is proportional to the foot pressure. The hydraulic brake system is provided with wheel brakes connected to the master cylinder and with a filling stage cylinder with a two-stage piston displaceably housed therein. A pressure chamber is provided in front of the large stage of the two-stage piston and a filling chamber is arranged in front of the small stage of the two-stage piston. The filling chamber communicates with one of the working chambers of the master cylinder and/or a brake line by way of a pressure line.

A device featuring the above characteristics is known from German printed patent application (DE-OS) No. 31 08 908.9. In the known brake booster, a master cylinder piston is arranged in a first cylinder bore, forming one component together with a booster piston. In this arrangement, a tappet connects the master cylinder piston and booster piston with each other. A pedal-side front face of the booster piston confines a booster chamber formed within the housing and is arranged coaxially in respect of a pedal-operable piston rod. Hinged to the piston rod, on its part, is a lever arrangement for the actuation of a brake valve. By applying a force to the piston rod and by actuating the brake valve, it is possible to supply a pressure into the booster chamber which is proportional to the actuating force and which displaces the booster piston and the master cylinder piston connected with the booster piston in the direction of actuation of the power booster. Accordingly, a corresponding pressure is built up in the working chamber of the master cylinder. Connected to the working chamber of the master cylinder are wheel brakes which are pressurized in this manner. Accordingly, a corresponding slowing-down of a vehicle results. Upon pressurization of the booster chamber, the piston rod connected with the brake pedal will likewise be pressurized. Thus, a corresponding reaction force will be felt at the pedal which will provide feed-back to the drive of the vehicle with regard to the intensity of the braking operation initiated by him.

Vehicles with a high permissible total weight need a high boosting factor so as to keep the foot pressure and the pedal travel within the desired limits. Upon a failure of the booster, this will lead to undesirable or even unduly high foot pressures and short pedal travels. It is thus an object of the present invention to provide a brake system of the type described which in the even of a booster failure, works with a reduced effective master brake cylinder surface and which can be coupled with brake slip monitoring and controlling electronics.

SUMMARY OF THE INVENTION

According to this invention, this is achieved in that the booster piston plunges into an annular chamber arranged between the master cylinder and brake booster, which annular chamber communicates with the pressure chamber of the filling stage cylinder, on the one hand, and with the supply reservoir, on the other hand. A valve is connected in the pressure medium path from the annular chamber to the supply reservoir which is operable by the pressure in the booster chamber. In one of its positions, the valve locks the pressure medium passage towards the supply reservoir and thus, permits the pressure medium to flow from the annular chamber into the pressure chamber of the filling stage cylinder during the braking operation. In the other position, the valve connects the annular chamber with the supply reservoir.

Preferably, a multi-directional valve is provided which is operated by the piston of the filling stage cylinder in a first position, the multi-directional valve connects a reservoir, which communicates with the working chambers of the master cylinder, by way of the connecting sockets with the supply reservoir. In a second position, the multi-directional valve connects the reservoir, which corresponds with the working chambers of the master cylinder with the booster chamber. In this arrangement, the annular chamber communicating with the filling stage cylinder by way of pressure lines is advantageously formed by a bore section and a collar of the housing, on the one hand, and by the tappet or shaft connecting the booster piston with the master cylinder piston and by the booster piston, on the other hand.

By way of housing channels, the reservoir connected to the multi-directional valve expediently communicates with annular chambers which are arranged behind the master cylinder pistons and which, on their part, correspond with the working chambers in front of the master cylinder pistons by way of bores in the master cylinder pistons, which bores can be locked by gaskets.

So as to enable the pressure medium to dynamically flow into the brake circuits, a mechanically operated 3/2-way valve is provided. The feeler or actuating bolt of the valve resets at a shaft portion connecting the small stage and the large stage of the two-stage piston. In a first operating position, the annular chamber formed by the two stages, the shaft portion, and the stepped bore and the pressure chamber provided in front of the large stage are connectible with the annular chambers in the master cylinder which correspond with the working chambers. In a second operating position, the annular chamber and the pressure chamber are connectible with the booster chamber by way of the multi-directional valve.

BRIEF DESCRIPTION OF THE DRAWING

An embodiment of the present invention is schematically represented in the accompanying drawing in which the single FIGURE provides a connection diagram of a brake system in accordance with the present invention wherein the master cylinder, brake booster, and filling stage cylinder are illustrated in longitudinal section.

DETAILED DESCRIPTION

The reference numeral 1 marks a housing wherein a cylinder bore 2 is provided. The cylinder bore 2 has a bore section 38 of smaller diameter and a bore section 39 of enlarged diameter. In the smaller diameter bore section 38, two master cylinder pistons 40, 41 are guided in a sealed manner, whereas in the enlarged diameter bore section 39, a booster piston 4 is guided in a sealed manner, said booster piston 4 being coupled with the master cylinder piston 41. Thus, two master cylinder pistons 40, 41 are housed in the master cylinder 3, each of the master cylinder pistons confining a working chamber 26, 27 which are communicating with wheel brakes 14, 15, 16, 17 of an automotive vehicle by way of ports 42, 43 and by way of respective brake lines 28, 29.

The pedal-side front face of the booster piston 4 has an extension 44 ending in a pedal-side enlarged head 45. The head 45, or rather the extension 44, is supported with an axial play s in a sleeve 10. The sleeve 10 is part of a piston rod 8 connected with a brake pedal 46. The sleeve 10 has an annular collar 47 which is extending axially outwards and which, in the brake's release position discernible from the illustration, is supporting itself at a shoulder 48 of the housing 1.

Sealed, a slide 9 is guided within the sleeve 10. The slide 9 has communication with an actuation rod 11 directly connected with the brake pedal 46. In the brake release position, as shown in the drawing, the right end of the slide 9 abuts against a step 49 of the sleeve 10, thus the brake release position of the brake booster is definitely fixed.

Further, a bore 50 is provided in the housing of the brake booster 5. In the bore 50, a control slide 51 of a brake valve 6 is housed in an axially displaceable manner. The control slide 51 has an essentially cylindrical design and has an axial bore 52 which, in the brake release position, establishes a hydraulic communication to an unpressurized supply reservoir 55 by way of a housing channel 53 and a radial bore 54. Thus, also in the brake release position of the hydraulic brake booster, there will be an atmospheric pressure in a booster chamber 7. Further, the control slide 51 has a radial channel 56. Upon a corresponding displacement of the control slide 51, a housing channel 57 is connectible with the booster chamber 7 by way of radial channel 56, to the housing channel 57 an auxiliary pressure supply source 13 is connected. A compression spring 58 prestresses the control slide 51 in the brake release direction.

Referring to the drawing figure, the end of a first lever 59 bears against the right end of the control slide 51, the other end of the lever 59 engaging a recess 60 of the sleeve 10. By way of a pivot 61, a second lever 62 is connected with the first lever 59. Referring to the drawing, the upper end of the second lever 62 is stationarily rested in the housing 1 and its lower end engages a recess 89 of the slide 9. The slide 9 is axially displaceable relative to the sleeve 10 in the brake actuating direction, a compression spring 63 being clamped between the left end of the slide 9 and the sleeve 10.

The booster piston 4 is connected with the master cylinder piston 41 by way of a shaft 64. Between the shaft 64, the booster piston 4, the collar 36, and the housing 1 an annular chamber 65 is formed which permanently communicates with the filling stage cylinder 18 by way of a housing channel 66. The master cylinder piston 41 is sealed by a gasket 67 which, in the illustrated brake release position, establishes a communications towards the working chamber 26 of the master cylinder 3 by way of bores 68, further an expansion bore 70 being arranged in the direction of actuation in front of the gasket 67. Upon the application of the brake, the gasket 67 will interrupt a hydraulic communication between the reservoir and the working chamber 26. Together with the housing 1, the master cylinder piston 40 likewise encloses an annular chamber 71 which permanently communicates with the supply reservoir 69 by way of a housing channel 72. At the master cylinder piston 40, also, there is a gasket 73 by means of which an expansion bore 74 can be locked upon displacement of the master cylinder piston 40, thus the working chamber 27 of the master cylinder 3 being pressurized. Clamped between the bottom 75 of the cylinder bore 38 and the master cylinder piston 40 is a first return spring 76. Likewise, a second return spring 77 is arranged between the two master cylinder pistons 40, 41.

By way of a housing channel 66 and the connection line 24, the annular chamber 65 is connected to the pressure chamber 21 of a filling stage cylinder 18. The filling stage cylinder 18 has a stepped bore 19 wherein a two-stage piston 20 is housed displaceably against the force of a spring element 23. The filling chamber 22 formed by the small stage 84 of the two-stage piston 20 and the left part of the filling stage cylinder 18 communicates with the working chamber 27 of the master cylinder 3, or rather with the brake line 28 by way of a pressure line 25. Connected into the connection line 24 is a directional valve 79 communicating with the supply reservoir 55 by way of line 80 and connecting the annular chamber 65 either with the supply reservoir 55 or with the pressure chamber 21. The two-stage piston 20 of the filling stage cylinder 18 has a ramp 37 wherein the feeler pin 30 of a multi-directional valve 31 is resting. The multi-directional valve 31 is connected to the supply reservoir 55 by way of a return line 32, to the booster chamber 7 by way of a pressure line 33, and to the pressure reservoir 69 and the annular chamber 81 by way of a branch line 34.

In the following, the mode of operation of the described brake system will be explained in more detail, the explanations starting from the brake release position wherein all moving parts will have adopted the positions illustrated in the drawing. The booster chamber 7 of the hydraulic power booster communicates with the unpressurized supply reservoir 55 by way of the control slide 51, the housing channel 53, and the line 82. Thus, neither the piston rod 8, nor the booster piston 4, is acted upon by any force and the wheel brakes 14, 15, 16, 17 connected to the master cylinder 3 are under atmospheric pressure at the respective directional valves united in the valve block 90 are open.

With actuating force F applied to the brake pedal 46, the slide 9 will displace itself against the force of the compression spring 63 to the left, thereby the second lever 62 performs a clockwise swinging movement around the stationary point of the support 83 in the housing 1. Due to the seals sealing the booster piston 4 and the master cylinder pistons 40, 41, as well as due to the return springs 76, 77, the lower end of the first lever 59, as seen in the drawing, will at first be counteracted by a relatively strong resistance. Thus, the upper end of the lever 59 will move the control slide 51 of the brake valve 6 to the left so that the control slide 51 at first will lock the housing channel 53 of the brake valve 6 and the booster chamber 7 will be separated from the unpressurized supply reservoir 55. Upon an increase of the force at the brake pedal 46, the result of a continued displacement of the control slide 51 will be that the housing channel 57 will overlap with the radial channel 56 of the control slide 51. Thus, pressure medium will flow from the pressure source 13 into the booster chamber 7, which will pressurize the slide 9 with its relatively small effective surface, on the one hand, and will act on the booster piston 4, on the other hand. Thereby the booster piston 4 will be displaced within the bore section 39 to the left in the drawing and perform a relative displacement with regard to the sleeve 10. During this phase of the brake application, a relatively small reaction force will be felt at the brake pedal 46, said force resulting from the pressure prevailing in the booster chamber 7 and from the effective surface of the slide 9. In this contemplation, the action of the compression spring 63 may be neglected as the rating compression spring 63 will have to be only strong enough to overcome the friction of the seal between the slide 9 and the sleeve 10 in the brake release phase.

Upon a certain pressure level in the booster chamber 7 of the hydraulic power booster, the booster piston 4, overcoming the frictions, will start moving with the master cylinder piston 41 in the direction of actuation. Thus, a hydraulic pressure will form in the working chamber 26 of the master cylinder 3. Said hydraulic pressure will be fed to the wheel brakes 16, 17 by way of a respective brake lines 29. On the other hand, the pressure volume in the working chamber 26 of the master cylinder 3 will cause the master cylinder piston 40 to be displaced in the direction of actuation, thus a hydraulic pressure likewise developing in the working chamber 27 of the master cylinder 3. Said hydraulic pressure will propagate to the wheel brakes 14, 15 by way of the brake line 28. With a second pressure, likewise predetermined, established in the booster chamber 7 of the hydraulic power booster 5, the booster piston 4 will have displaced itself relative to the sleeve 10 by the axial play s so that any further pressure increase in the working chambers 26, 27 of the master cylinder 3 will be possible only if there is an increased reaction force at the brake pedal 46 since now the entire surface is effective which is defined by the diameter of the sleeve 10. Consequently, the effect of an increase in the actuating force at the brake pedal 46 will be that in the working chambers 26, 27 of the master cylinder 3, a pressure is built up which will correspond to the pressure in the booster chamber 7 and which will directly become effective at the wheel brakes 14, 15, 16, 17 of the automotive vehicle.

When releasing the brake, the described motional operations will reverse. At first, the sleeve 10 will be moved with the slide 9 in the brake's release direction while the head 45 formed fast with the booster piston 4 at first will stay abutted with its left end against the sleeve 10. Upon a further pressure reduction in the booster chamber 7 of the hydraulic power booster, finally, the annular collar 47 will come to abut on the shoulder 48 of the housing 1. Thus, the booster piston 4 will be caused by the return springs 76, 77 to travel the play s in the brake release direction until the head 45 will again have come to abut with its right front face (see drawing) against the sleeve 10.

Upon a failure of the pressure source 13, respectively the working chambers 26, 27 of the master cylinder 3 or the wheel brakes 14, 15, 16, 17 connected to the working chambers 26, 27 can directly be pressurized by a mechanical force application to the brake pedal 46, the slide 9 at first having to cover a lost travel relative to the sleeve 10 until it will abut on the sleeve 10. By way of the sleeve 10, the master cylinder piston 41 subsequently will be displaced mechanically in the direction of actuation. In doing so, in a manner described, at first there will be a pressurization of the working chamber 26 and by way of the master cylinder 3, of the working chamber 27. Consequently, a brake application is also possible in the event of a failure of the pressure source 13. In this action, the play predetermined between the booster piston 4 and the sleeve 10 will not affect the pedal travel in any way.

The controlled pressure prevailing in the booster chamber 7 will also be supplied into the pressure chamber 21 of the filling stage cylinder 18 by way of the housing channel 66 and the connection line 24 as the directional valve 79 will be locked as soon as a pressure will have built up in the control line 78. The effective diameter of the large stage 83 of the two-stage piston 20 is rated such as to ensure that in this action, the two-stage piston 20 moves to the left against the force of the spring element 23 and urges the pressure medium existing in the filling chamber 22 into the brake line 28 by way of its small stage 84 and through the pressure line 25. Thus, upon a brake application and in case of an intact aggregate, not only the pressure medium existing in the two working chambers 26, 27 and displaced by the two master cylinder pistons 40, 41 will be supplied into the brake lines 28, 29 but also, in addition, the pressure medium existent in the filling chamber 22. However, the pressure in the booster chamber 7 dropping below a predetermined level (for example, upon failure of the auxiliary pressure supply source 13, that is, the directional valve 79 not switching over) then the two-stage piston 20 will remain in its right-hand initial position and the pressure medium existent in the filling chamber 22 will not be available for a braking operation. The volume of the filling chamber 22, which is displaced by the two-stage piston 20, is rated so as to enable a transmission change to be achieved by means of the filling stage cylinder 18. In case of an intact booster system, the effect of this transmission change will be that the master cylinder 3 will act like a master cylinder having a larger effective piston diameter (for example, 22 mm) whereas in case of a booster failure and of a correspondingly ineffective filling stage cylinder 18, the same master cylinder 3 will act like a master cylinder with comparatively smaller pistons, for example, 22 mm piston diameter. The described transmission change permits the driver of the vehicle still to effect a slowing-down after failure of the booster (while having to accept an increased pedal travel) even if the intact aggregate acts like a master cylinder with a larger-dimensioned piston.

While the directional valve 79 connected into the connection line 24, 80 leading from the annular chamber 65 to the supply reservoir 55 will be operated in dependence on the pressure in the booster chamber 7, or rather on the pressure in the lines 33 and 78, the changing-over of the multi-directional valve 31 will be effected in dependence on the position of the two-stage piston 20 of the filling stage cylinder 18. When, upon a brake application and with the brake booster 5 intact, the leftwards moving booster piston 4 displaces the pressure medium contained in the annular chamber 65 into the pressure chamber 21 by way of the housing channel 66 and the connection lines 24, 85, the leftwards traveling ramp 37 of the two-stage piston 20 will move the feeler pin 30 radially outwards so that the multi-directional valve will switch into its second position. Now, in the second position the pressure medium will flow from the booster chamber 7 into the working chambers 26, 27 by way of the pressure line 33, the multi-directional valve 31, the branch lines 34, the reservoir 69, the connecting sockets 86, 87, the housing channels 72, 88, and the bores 12, 68 of the master cylinder pistons 40, 41. From the working chambers 26, 27 it will flow to the wheel brakes 14, 15, 16, 17 by way of the brake lines 28, 29 and the valve block 90. Due to the described movement of the two-stage piston 20 of the filling stage cylinder to the left, the pressure medium existent in the filling chamber 22 will act on the brake lines 28, 29 by way of the pressure line 25. As in this position of the directional valve 31, the pressure in the annular chamber 81 of the filling stage cylinder 18 as well as the pressure in the annular chamber 65 of the booster 5 and, by way of the connection line 24, the pressure in the pressure chamber 21 will increase in correspondence with the pressure build-up in the booster chamber 7 a hydraulic locking of the two-stage piston 20 will be achieved. Thus, the pressure medium will flow to the wheel brakes 14, 15, 16. 17 in the exclusively dynamic manner by way of the reservoir 69, the annular chambers 71, 91, the working chambers 26, 27, the brake lines 28, 29, and the valve block 90.

Upon a failure of the brake booster 5 and upon a displacement of the master cylinder piston 41 by just the foot pressure, the directional valve 79 will remain in the position shown in the drawing so that the pressure medium existent in the annular chamber 65 will be supplied into the supply reservoir 55 by way of the lines 24, 80.

What is claimed is:

1. A hydraulic brake system comprising a pedal-operated brake booster (5) which is connected with a master cylinder (3) having working chambers therein, an auxiliary pressure supply system (13), a first fluid supply reservoir, a booster piston (4) reciprocable in a housing, and a booster chamber (7) wherein an auxiliary pressure is established which is proportional to a foot pressure (F) applied to the pedal-operated brake booster, and said hydraulic brake system being provided with wheel brakes (14, 15, 16, 17) connected to the master cylinder (3) and with a filling stage cylinder (18) with a two-stage piston (20) displaceably housed therein, the two-stage piston comprising a large stage piston and a small stage piston, a pressure chamber (21) provided in front of the large stage piston (83) and with a filling chamber (22) arranged in front of the small stage piston (84), the filling chamber (22) communicating by way of a pressure line (25) with one of the working chambers (27) of the master cylinder (3) and a brake line (28), wherein the booster piston (4) plunges into an annular chamber (65) arranged between the master cylinder (3) and the brake booster (5), said annular chamber (65) communicating with the pressure chamber (21) of the filling stage cylinder (18) and with the first supply reservoir (55), said system including a valve (79) which is connected in a pressure medium path (24, 80) from the annular chamber (65) to the first supply reservoir (55), said valve being operable by the pressure in the booster chamber (7), and wherein said valve blocks the pressure medium passage towards the first supply reservoir (55) in one of its positions thereby permitting the pressure medium to flow from the annular chamber (65) into the pressure chamber (21) of the filling stage cylinder (18) during the brake operation, and wherein said valve connects the annular chamber (65) with the first supply reservoir (55) in its other position.

2. A hydraulic brake system as claimed in claim 1, including a multi-directional valve (31) operated by the piston (20) of the filling stage cylinder (18), said multi-directional valve (31) connecting in a first position a second supply reservoir (69), which communicates with the working chambers (26, 27) of the master cylinder (3) via connecting sockets (86, 87), with the first supply reservoir (55), and said multi-directional valve (31) connecting in a second position the second supply reservoir (69), which communicates the working chambers (26, 27) of the master cylinder (3), with the booster chamber (7).

3. A hydraulic brake system as claimed in claim 1, wherein the annular chamber (65) communicates with the filling stage cylinder (18) by way of pressure lines (66, 24, 85), the annular chamber being formed by a bore section (39) and a collar (36) of the housing (1), and by a tappet or shaft (64) connecting the booster piston (4) with a master cylinder piston (41) and by the booster piston (4).

4. A hydraulic system as claimed in claim 1, wherein the second supply reservoir (69) is connected by way of housing channels (72, 88) to annular chambers (71, 91) which are arranged behind master cylinder pistons (40, 41) located in the master cylinder, the annular chambers communicating with the working chambers (26, 27) in front of the master cylinder pistons (40, 41) by way of bores (12, 68) in the master cylinder pistons (40, 41), said bores (12, 68) being normally closed by gaskets (73, 67).

5. A hydraulic brake system as claimed in claim 1, including a mechanically operable 3/2-way valve (31) having a feeler actuating bolt (30) which resets at a shaft portion intermediate the small stage (84) and the large stage (83) of the two-stage piston (20), a filling stage cylinder annular chamber (81) formed by the large and small stage pistons, the shaft portion, and a stepped bore (19) defined in the filling stage cylinder being connectible in a first operating position with the annular chambers (71, 91) in the master cylinder (3) which communicate with the working chambers (26, 27) and said filling stage cylinder annular chamber (81) being connectible in a second operating position with the booster chamber (7) by way of the multi-directional valve (31).

* * * * *